(12) United States Patent
Nishiyama et al.

(10) Patent No.: US 6,907,733 B2
(45) Date of Patent: Jun. 21, 2005

(54) VARIABLE TURBOCHARGER

(75) Inventors: Toshihiko Nishiyama, Oyama (JP); Hiroshi Sugito, Oyama (JP); Takahisa Iino, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/496,934

(22) PCT Filed: Nov. 29, 2002

(86) PCT No.: PCT/JP02/12501

§ 371 (c)(1),
(2), (4) Date: May 26, 2004

(87) PCT Pub. No.: WO03/046346

PCT Pub. Date: Jun. 5, 2003

(65) Prior Publication Data

US 2004/0261413 A1 Dec. 30, 2004

(30) Foreign Application Priority Data

Nov. 30, 2001 (JP) ........................................ 2001-367806

(51) Int. Cl.[7] .......................... F02B 37/12; F02B 37/24; F04D 17/16
(52) U.S. Cl. ...................... 60/602; 29/889.22; 415/150; 415/164; 415/166
(58) Field of Search ............................ 60/602; 415/150, 415/159–166; 29/889.22

(56) References Cited

U.S. PATENT DOCUMENTS

| 4,741,666 A | * | 5/1988 | Shimizu et al. ............. 415/158 |
| 6,582,190 B2 | * | 6/2003 | Jinnai .......................... 60/602 |

FOREIGN PATENT DOCUMENTS

| JP | 05164091 A | * | 6/1993 | ........... F04D/29/46 |
| JP | 6-26352 A | | 2/1994 | |
| JP | 2511168 Y2 | | 6/1996 | |
| JP | 10-89082 A | | 4/1998 | |
| JP | 11-132048 A | | 5/1999 | |
| JP | 11-343857 A | | 12/1999 | |
| JP | 2003-172145 A | | 6/2003 | |

* cited by examiner

Primary Examiner—Sheldon J Richter
(74) Attorney, Agent, or Firm—Frishauf, Holtz, Goodman & Chick, P.C.

(57) ABSTRACT

One of the swing shafts 32 of the nozzle vanes 31 is selected so as to operate as swing drive shaft 33 that projects to the outside. As the swing drive shaft 33 is driven to revolve, all the nozzle vanes 31 are driven to turn by a same angle by way of the driving lever 21 and the coupling ring 18 linked to it. Therefore, it is only the swing drive shaft 33 that projects to the outside, the projecting part can be sealed in a simple and reliable manner to improve the sealing effect and the durability of the variable geometry turbocharger. Additionally, since the rotary motion of the swing drive shaft 33 is directly used to driven the nozzle vanes 31 to swing, the mechanism for transmitting the driving force is simplified.

16 Claims, 6 Drawing Sheets

VARIABLE TURBOCHARGER

This application is a U.S. National Phase Application under 35 USC 371 of International Application PCT/JP02/12501 filed Nov. 29, 2002.

TECHNICAL FIELD

This invention relates to a turbocharger. More particularly, the present invention relates to a variable geometry turbocharger provided with nozzle vanes to regulate the exhaust flow rate of an exhaust turbine.

BACKGROUND ART

Turbochargers adapted to driving an exhaust turbine, utilizing exhaust energy of an engine, to by turn drive a charging compressor are known as a method for compressing air and causing the engine to take in compressed air. Since such a turbocharger utilizes exhaust gas of an engine, the flow rate of exhaust gas is reduced and hence the exhaust turbine revolves at a low rpm in a low rpm range of the engine so that it is practically impossible for the charging compressor to operate effectively. A method of making the nozzle area of the turbocharger variable is known to improve its performance. Such a turbocharger is called a variable geometry turbocharger.

In variable geometry turbochargers, movable nozzle vanes are arranged in the nozzle of the exhaust turbine and the nozzle area (the nozzle aperture area) is regulated by driving the nozzle vanes to swing. Since the displacement volume of the engine is small in a low rpm range of the engine, the flow rate of exhaust gas flowing into the exhaust turbine is raised by driving the nozzle vanes to swing so as to reduce the nozzle area and increase the rotational energy of the exhaust turbine wheel. In this way, it is possible to raise the supercharging capacity of the charging compressor.

Japanese Patent Laid-Open Publication No. Hei.11-343857 discloses such a known variable geometry turbocharger. Referring to FIG. 6 of the accompanying drawings, in a variable geometry turbocharger disclosed in the above-cited patent document, shafts 81 of a plurality of nozzle vanes 80 (indicated by dotted lines in FIG. 6) that are arranged on a stationary board 82 are fitted to the stationary board 82 so as to run through the board 82 and an actuator ring 83 is rotatably arranged at the outside (outer peripheral side) of the fixed board 82. The shafts 81 projecting from the stationary board 82 and the actuator ring 83 are linked to each other by levers 84. More specifically, each of the levers 84 is secured at an end thereof to the corresponding one of the shafts 81 of the nozzle vanes 80 and at the other end thereof to the corresponding one of fitting shafts 83B of the actuator ring 83 so as to be engaged with the shaft 83B and able to swing.

A ring-shaped support member 85 is arranged outside the above-described actuator ring 83 and provided with a supporting shaft 85A projecting from the periphery of it. A link arm 86 is supported by the supporting shaft 85A so as to be able to swing. The link arm 86 is connected at an end thereof to a projection 83A arranged on the actuator ring 83 and at the other end thereof to an actuator rod 87 adapted to turn a link arm 86 by way of respective oblong holes 86A, 86B.

With the above-described arrangement, as the actuator rod 87 is driven to axially reciprocate, the link arm 86 swings around the supporting shaft 85A so as to turn the actuator ring 83 connected to the corresponding end thereof.

As the actuator ring 83 turns, the levers 84 fitted to the actuator ring 83 also turns so that the shafts 81 also turn with them. As a result, the nozzle area can be regulated by changing the swinging angle of the nozzle vanes 80 whenever necessary.

Meanwhile, to improve the rotational efficiency of the exhaust turbine, the housing of the exhaust turbine is required to be effectively sealed for the purpose of efficiently supplying exhaust gas to the turbine wheel.

However, with the above-described variable geometry turbocharger, one of the opposite ends of the link arm 86 is located inside the exhaust turbine while the other end is located outside the exhaust turbine and driven to swing in this condition. Therefore, the housing covering the exhaust turbine needs to be provided with a sufficiently large slit that allows the link arm 86 to swing. Then, the housing is accompanied by a problem that it is difficult to maintain the effectively sealed condition of the slit for a long period of time.

Additionally, for the nozzle vanes 80 to be driven to swing, the linear motion of the actuator rod 87 needs to be converted into a rotary motion by means of the actuator ring 83 located inside the housing so that the link arm 86 has to be provided with oblong holes 86A, 86B to make the mechanism for transmitting the driving force a complex one.

DISCLOSURE OF THE INVENTION

An object of the present invention is to provide a variable geometry turbocharger having a simple configuration and showing an excellent sealing effect of an exhaust turbine. To achieve the object, in a variable geometry turbocharger according to the invention, a shaft of a predetermined nozzle vane can be driven to revolve without requiring any linear motion as described below.

A variable geometry turbocharger includes a pair of exhaust introducing walls arranged oppositely relative to a nozzle located outside an exhaust turbine wheel, a plurality of nozzle vanes supported by respective shafts so as to be able to swing and arranged between the exhaust introducing walls along the periphery of the exhaust turbine wheel at regular intervals, swinging motion transmitting members coupled respectively to the parts of swing shafts of the nozzle vanes projecting from the exhaust introducing walls and a coupling ring linked to the swinging motion transmitting members and adapted to interlock the swinging motion transmitting members and that at least one of the swing shafts of the plurality of nozzle vanes operates as a swing drive shaft to be externally driven.

With the above-described arrangement, while all the swing shafts of the nozzle vanes are interlocked by the swinging motion transmitting members and the coupling ring, at least only one of the swing shafts of the nozzle vanes operates as the swing drive shaft. Therefore, all the nozzle vanes are driven to swing by a same angle as the swing drive shaft is driven to revolve by a predetermined angle. Thus, only a rotary motion that takes place around a shaft is applied from the outside of the exhaust turbine housing so that the housing only needs to be sealed from the viewpoint of a rotary motion that takes place around the shaft and hence it is easy to obtain a good sealing effect. Additionally, since the swing drive shaft is driven to revolve and hence only rotary motions and swinging motions are transmitted within the housing, no link arm is required to simplify the mechanism for transmitting the driving force if compared with the prior art.

The swing drive shaft may be driven to revolve by transmitting the rotary motion of the motor arranged outside of the exhaust turbine housing directly or by way of appropriately selected transmitting portions such as a gears, a chain or a belt.

Further for the purpose of the present invention, the part off the swing drive shaft between the externally extending end thereof and the swinging motion transmitting member coupled to the swing drive shaft is more rigid than the part of the swing drive shaft between the swinging motion transmitting member and the corresponding nozzle vane.

The swing drive shaft is required to drive all the other nozzle vanes to turn by way of the swinging motion transmitting members and the coupling ring. When it is driven to turn, a large torsional torque is applied to the part thereof between the externally extending end thereof and the swinging motion transmitting member coupled to it. Thus, the swing drive shaft would not be easily damaged because the part of the swing drive shaft that is subjected to such a large torsional torque is made highly rigid according to the present invention.

For the purpose of the invention, the expression of "highly rigid" refers to a level of rigidity that prevents the swing drive shaft from being damaged when rotational force is applied thereto to drive all the nozzle vanes so as to swing by a predetermined angle.

The swing drive shaft can be made highly rigid by increasing the diameter of the above-described part or forming that part by a highly rigid material.

For the purpose of the present invention, preferably, the swing drive shaft is bonded to the corresponding swinging motion transmitting member by welding or by brazing.

With this arrangement, the swing drive shaft that is subjected to a load greater than the load of each of the shafts of the other nozzle vanes is made structurally highly secure because it is bonded to the swinging motion transmitting member by welding or by brazing. Therefore, the swing drive shaft is free from the risk of being deformed or broken at the part thereof bonded to the swinging motion transmitting section.

For the purpose of the present invention, preferably, the swinging motion transmitting member of the nozzle vane where the swing drive shaft is arranged is more rigid than the swinging motion transmitting members of all the other nozzle vanes.

The swinging motion transmitting member that is coupled to the swing drive shaft is driven to turn by the swing drive shaft and subjected to a load greater than the load of any other swinging motion transmitting members because it has to drive the coupling ring to which all the other swinging motion transmitting members are linked when transmitting a swinging motion. With the above-described arrangement, however, the swinging motion transmitting member is free from the risk of being damaged when transmitting a swinging motion because it is made highly rigid.

The swinging motion transmitting member can be made highly rigid by increasing the width or the height of that member or forming that member by a highly rigid material.

For the purpose of the present invention, preferably, the coupling ring is arranged inside the region surrounded by the swing shafts of the nozzle vanes.

With this arrangement, the entire variable geometry turbocharger can be made small and highly compact because the coupling ring is arranged inside the swing shafts of the nozzle vanes.

For the purpose of the present invention, preferably, the swing drive shaft projects to the outside through the housing that covers the exhaust turbine wheel.

With this arrangement, the rotational driving force coming from an external motor or the like is transmitted to the swing drive shaft outside the housing of the exhaust turbine wheel to structurally simplify and dimensionally reduce the variable geometry turbocharger. Additionally, the sealing effect of the housing is improved.

BEST MODE FOR CARRYING OUT THE INVENTION

Now, the present invention will be described by referring to the accompanying drawings according to an embodiment of the present invention.

Firstly, the configuration of the embodiment will be described below.

Figure 1:
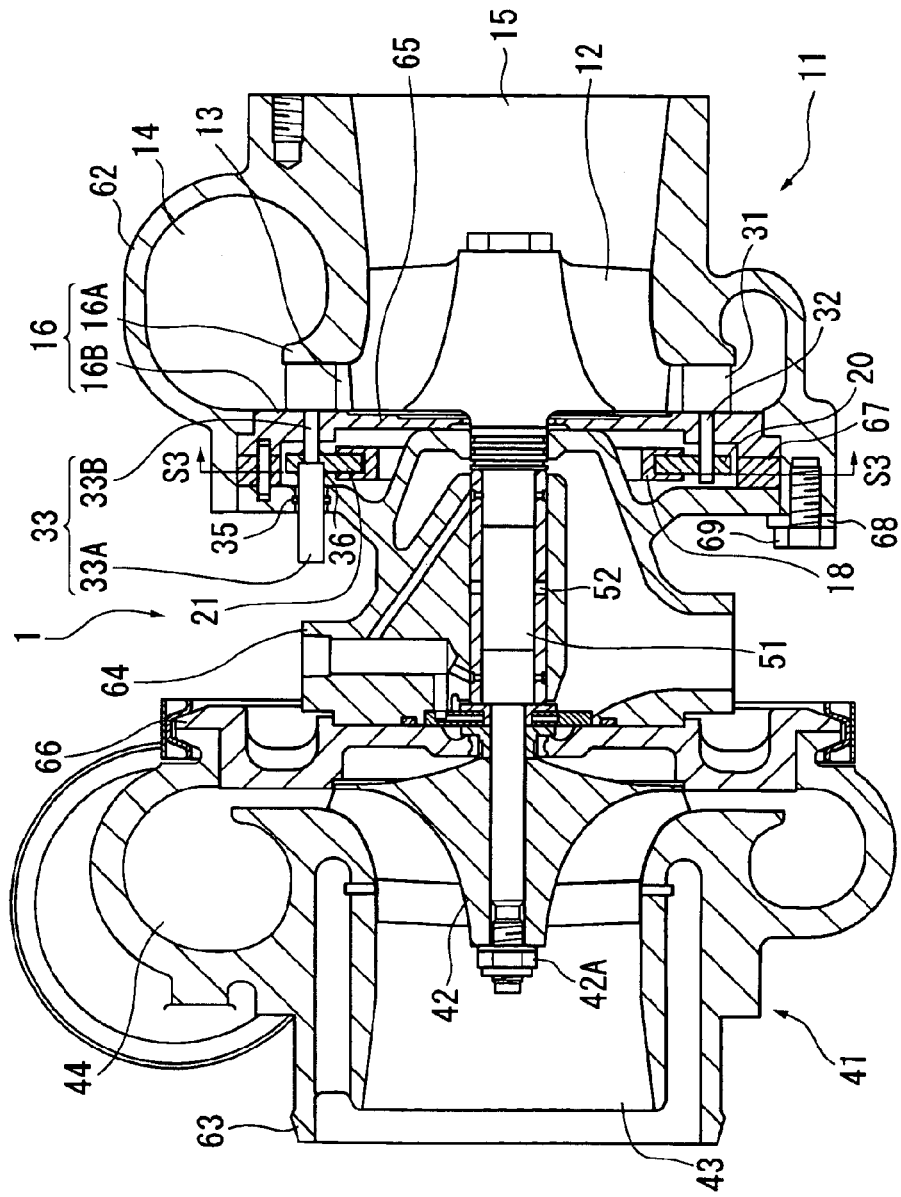
FIG. 1 is a cross sectional view showing the overall configuration thereof according to an embodiment of the present invention.

FIG. 1 is a cross sectional view of the embodiment, showing the overall configuration thereof.

Referring to FIG. 1, a variable geometry turbocharger 1 includes an exhaust turbine 11 and a charging compressor 41.

The exhaust turbine 11 is arranged midway of the exhaust flow path of an engine (not shown) and provided with a turbine housing 62 that guides the inflow and the outflow of exhaust gas and an exhaust turbine wheel 12 contained in the turbine housing 62.

The turbine housing 62 is provided as integral parts thereof with an exhaust inflow section 14 arranged at the outer peripheral side thereof and having a cross section that diminishes toward the inflow front end and an exhaust outflow section 15 arranged at the center and having a substantially cylindrical profile. An exhaust side inner plate 65 is arranged in the inside of the turbine housing 62 so as to close the opening opposite to the exhaust outflow section 15. The gap that is formed between the exhaust side inner plate 65 and the turbine housing 62 and along the outer periphery of the exhaust turbine wheel 12 operates as a nozzle 13 for feeding the flowing-in exhaust to the exhaust turbine wheel 12. The nozzle 13 will be described in greater detail hereinafter.

The exhaust turbine wheel 12 is provided as integral part thereof with a shaft 51 that runs through the exhaust side inner plate 65 and rotatably arranged in the inside of the turbine housing 62. The shaft 51 of the exhaust turbine wheel 12 is supported by a bearing housing 64 by way of a bearing 52. The bearing housing 64 is rigidly secured to the turbine housing 62 by an engaging piece 68 and a screw bolt 69 in a condition of being engaged with the turbine housing 62 and the space defined by the exhaust side inner plate 65, the bearing housing 64 and the turbine housing 62 is hermetically sealed by a spacer 67.

The charging compressor 41 is arranged midway of the intake flow path of the engine (not shown) and provided with a compressor housing 63 that guides the inflow/outflow of atmosphere (air intake) and an impeller 42 contained in the compressor housing 63.

The compressor housing 63 is provided as integral parts thereof with an intake inflow section 43 formed at the center thereof and having a substantially cylindrical profile and an intake outflow section 44 formed along the outer periphery thereof and having a cross section that increases toward the outflow front end. The compressor housing 63 is closed at the opening opposite to the intake inflow section 43 by a compressor back plate 66. The compressor back plate 66 is rigidly secured to the compressor housing 63 typically by a V-shaped clamp covering its outer periphery and also to the bearing housing 64 by a bolt (not shown).

The impeller 42 is rigidly secured to the shaft 51 of the exhaust turbine wheel 12 projecting toward the intake inflow section 43 by a nut 42A and rotates with the exhaust turbine wheel 12.

With the variable geometry turbocharger 1 having a configuration as described above, exhaust gas ejected from the engine flows into the exhaust turbine 11 by way of the exhaust inflow section 14 connected to the exhaust flow path. Thereafter, exhaust gas is introduced into the exhaust inflow section 14 and then into the exhaust turbine wheel 12 by way of the nozzle 13 so as to drive the exhaust turbine wheel 12 to revolve by the pressure difference between the opposite sides of the vanes and expelled to the exhaust flow path of the engine by way of the exhaust outflow section 15.

As the exhaust turbine wheel 12 revolves, the impeller 42 is driven to revolve by way of the shaft 51 so as to compress the air intake taken in from the intake inflow section 43 and forces out the compressed air from the intake outflow section 44. The delivered compressed air is then supplied to the engine by way of the intake flow path.

Now, the nozzle 13 will be described below in greater detail.

Figure 2:
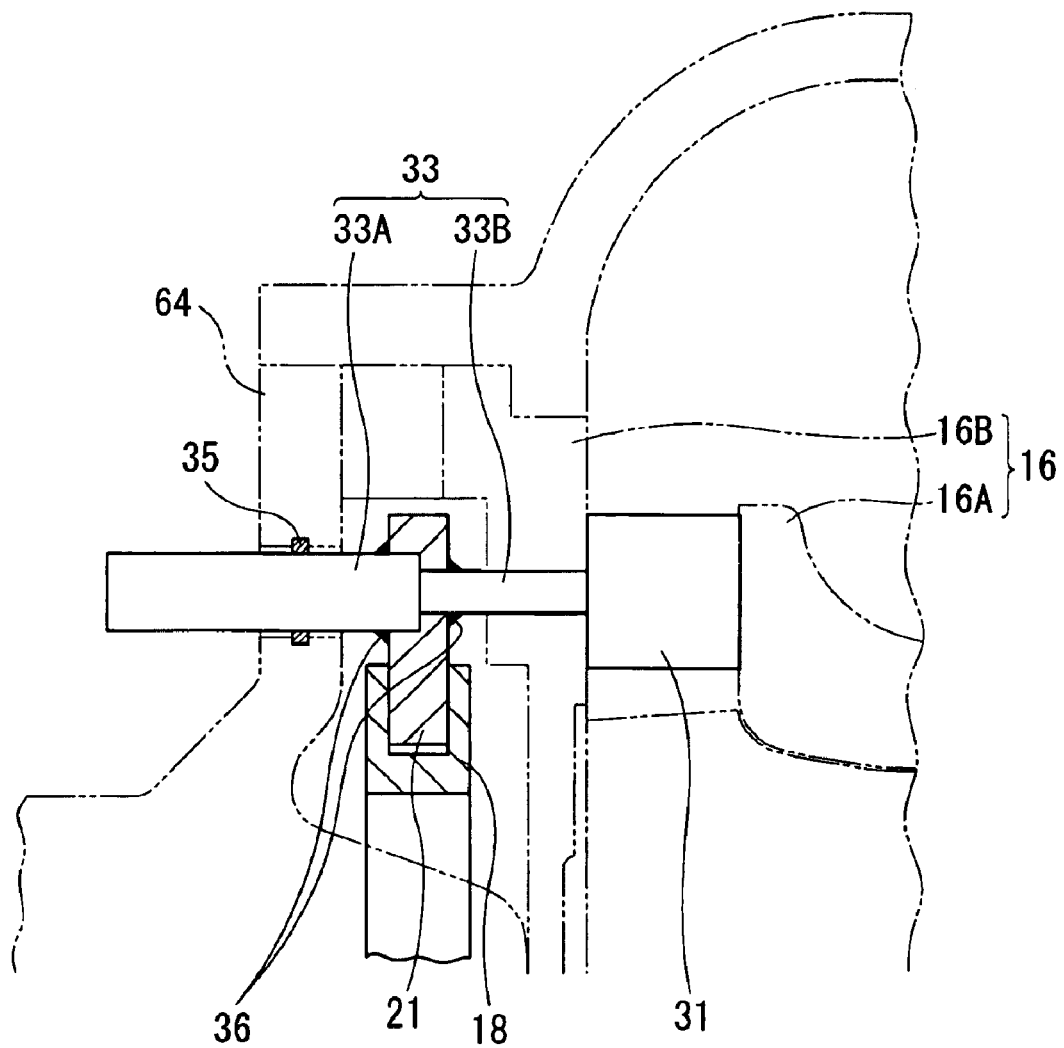
FIG. 2 is an enlarged view showing a part of a swing drive shaft of FIG. 1.

Referring to FIGS. 1 and 2, the nozzle 13 is formed by the above-described gap that is defined by a pair of exhaust introducing walls 16 (16A, 16B) that are oppositely disposed parts of the turbine housing 62 and the exhaust side inner plate 65. As shown also in FIGS. 3 and 4, a plurality of nozzle vanes 31 are arranged at regular intervals in the gap between the pair of exhaust introducing walls 16 along the outer periphery of the exhaust turbine wheel 12.

The nozzle vanes 31 are provided with respective swing shafts 32 that run through the exhaust introducing wall 16B at the side of the shaft 51 so as to around the respective swing shafts 32.

Figure 3:
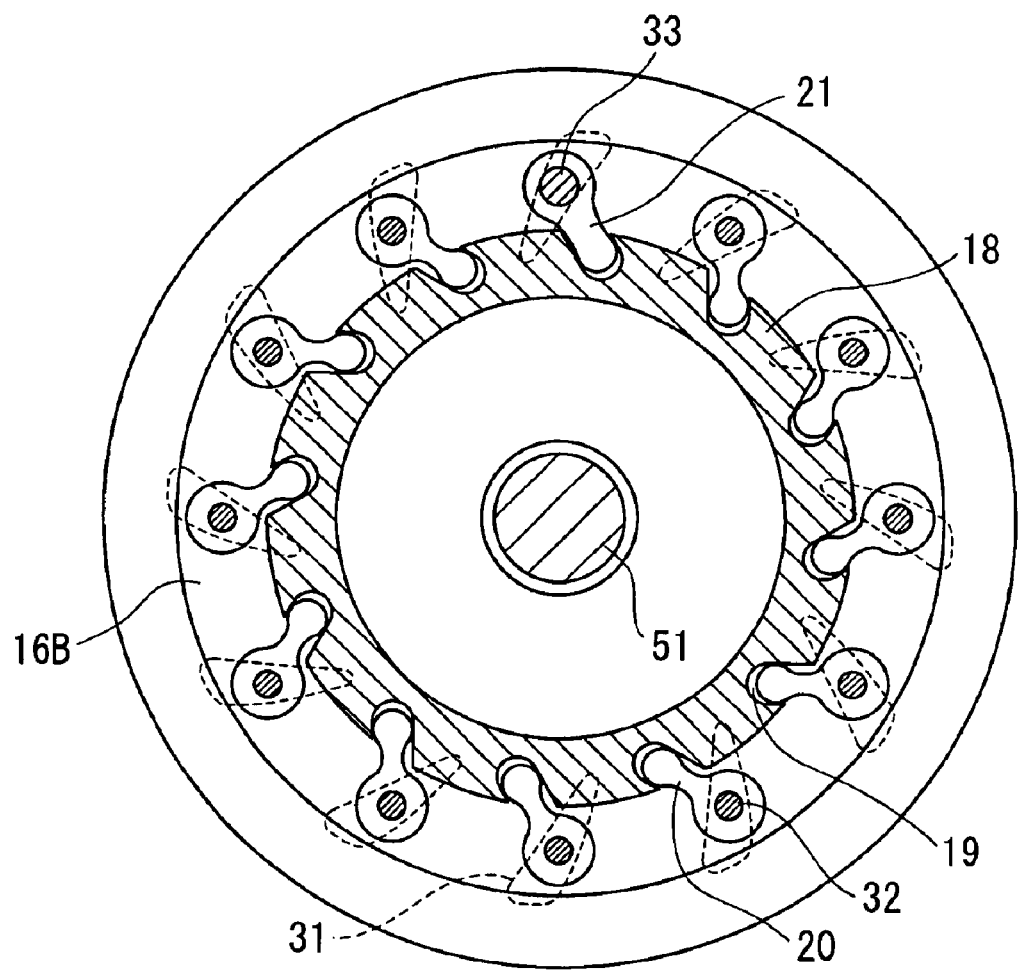
FIG. 3 is a cross sectional view taken along line S3—S3 in FIG. 1.
Figure 4:
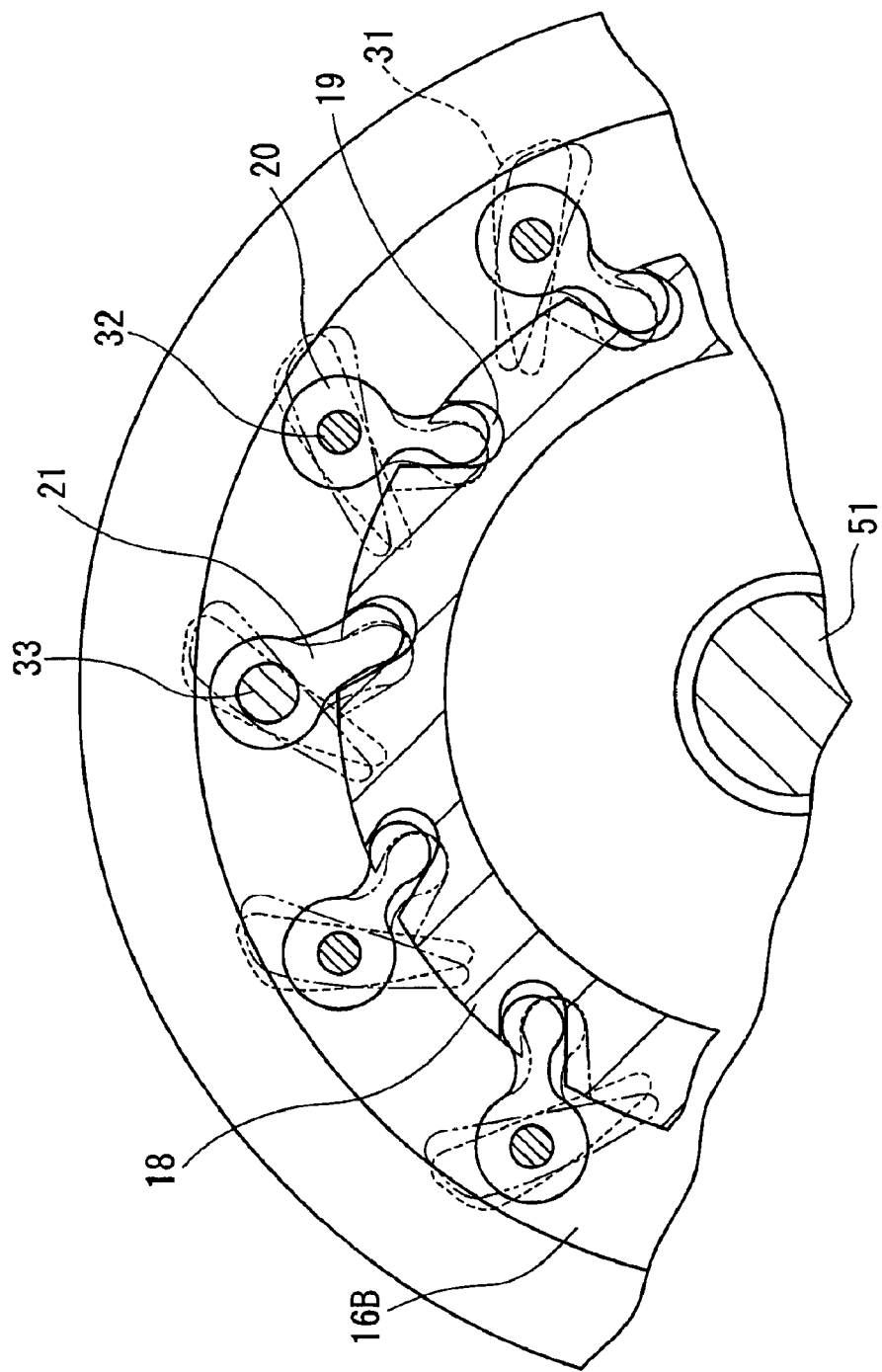
FIG. 4 is an enlarged view of FIG. 3.

As shown in FIGS. 3 and 4, a coupling ring 18 is arranged inside a region defined by the swing shafts 32 of the nozzle vanes 31 that are arranged on a circle. The coupling ring 18 is coaxial with the shaft 51 and can turn round. The coupling ring 18 is provided along its outer periphery with engaging holes 19 having a profile of a half of a circle. Rod-shaped levers 20 are engaged at an end thereof with the respective engaging holes 19. The rod-shaped levers 20 operate as swinging motion transmitting sections and can turn and slide in the respective engaging holes 19. The other end of each of the lever 20 is rigidly secured to the corresponding one of the swing shafts 32. Thus, the coupling ring 18 is supported by the swing shafts 32 by way of the levers 20.

A ring-shaped support section that is coaxial with the shaft 51 may be arranged inside the exhaust side inner plate 65 or the bearing housing 64 so as to support the coupling ring 18 by way of a roller bearing or the like. With such an arrangement, the influence of the self-weight of the coupling ring 18 and that of vibrations of the exhaust turbine 11 can be reduced so that the coupling ring 18 will be supported more reliably.

One of the swing shafts 32 of the nozzle vanes 31 is designed to be a swing drive shaft 33 that runs through the bearing housing 64 as shown in FIGS. 1 and 2. Additionally, one of the levers 20, which is the one that is coupled to the swing drive shaft 33 is designed to be a driving lever 21.

The swing drive shaft 33 is formed by a first member 33A and a second member 33B, of which the first member 33A takes the part extending between the driving lever 21 and the front end of the swing drive shaft 33 and is supported so as to be able to turn round in the through hole of the bearing housing 64. The part of the first member 33A that is located in the through hole is hermetically sealed by a sealing portion 35. The first member 33A has a diameter greater than that of the second member 33B that takes the part extending between the driving lever 21 and the corresponding nozzle vane 31. Additionally, the first member 33A is highly rigid. More specifically, the first member 33A is rigid enough for driving the coupling ring 18, to which all the swing shafts 32 of all the nozzle vanes 31 are linked, to turn by way of the driving lever 21. The first member 33A and the second member 33B are individually linked to the driving lever 21 by respective joints 36.

The swing drive shaft 33 having the above-described configuration is driven by a motor (not shown) arranged outside the bearing housing 64. The motor is electrically connected to an angle controller for controlling the vane angles of the nozzle vanes 31. The angle controller is by turn electrically connected to an engine controller for controlling the fuel injection rate etc. in order to detect the running condition of the engine and computationally determines the requirements to be met in order to secure an optimal nozzle area on the basis of an engine speed signal and a fuel supply rate signal representing the rate at which fuel is supplied to the engine that are output from the engine controller.

On the other hand, the driving lever 21 is bigger than all the other levers 20 as seen from FIG. 3 and highly rigid. More specifically, the driving lever 21 is rigid enough for transmitting the swinging/driving force from the swing drive shaft 33 to the coupling ring 18.

Now, the operation of the present embodiment will be described below.

The angle controller arithmetically determines the flow rate of exhaust gas on the basis of the engine speed signal and the fuel supply rate signal from the engine controller and outputs a signal representing the number of revolutions per unit time necessary to secure an optimal nozzle area to the motor.

Upon receiving the signal, the motor drives the swing drive shaft 33 by a predetermined angle. The swinging force is then transmitted further to the driving lever 21 to turn the coupling ring 18 that is engaged with the driving lever 21. As the coupling ring 18 is turned, the driving lever 21 is driven to swing along with all the other levers 20 that are engaged with the coupling ring 18. As a result, all the nozzle vanes 31 linked to the levers 20 and the driving lever 21 are driven to swing by a same angle simultaneously.

When the exhaust gas flow rate is small as computationally determined on the basis of the engine speed signal and the fuel supply rate signal from the engine controller in a low rpm range of the engine, the angle controller outputs a signal for turning the nozzle vanes 31 in respectively directions necessary for closing them to the motor. Upon receiving the signal, the motor operates to turn the nozzle vanes 31 in respective directions necessary for closing them as shown in FIG. 4. As a result, the nozzle area is reduced to increase the flow rate of exhaust gas being introduced into the exhaust turbine 11 and raise the rotational energy of the exhaust turbine 11. As the rpm of the exhaust turbine 11 increases, the engine speed of the impeller 42 of the charging compressor 41 rises to consequently raise the supercharging capacity of the embodiment.

When the engine is found in a high rpm range and the exhaust gas flow rate is sufficiently high, it is not necessary to raise the supercharging capacity of the embodiment. Therefore, the nozzle vanes 31 are swung in respective directions necessary for opening them. As a result, the exhaust gas expelled from the engine is introduced into the exhaust turbine 11 without its flow rate being raised significantly.

The above-described embodiment provides the following advantages.

In the variable turbine charger 1, one of the swing shafts 32 of the nozzle vanes 31 is used as the swing drive shaft 33 that is driven externally so that all the other nozzle vanes 31 are swung as the swing drive shaft 33 is driven to revolve. As a result, the part of the exhaust turbine 11 that runs through and extends from the bearing housing 64 is turns around a shaft and can be easily and reliably sealed by the sealing portion 35 to reliably maintain the airtightness of the exhaust turbine 11.

The rotary motion of the swing drive shaft 33 is transmitted to the nozzle vanes 31 by way of the driving lever 21 and the coupling ring 18. Therefore, unlike the prior art, no link arm 86 is required and the driving force can be transmitted with a simple arrangement.

The first member 33A of the swing drive shaft 33 is made more rigid than the second member 33B thereof. Therefore, the first member 33A can sufficiently withstand the torque applied thereto when the swing drive shaft 33 is driven to revolve. Hence, it is free from the risk of being deformed or damaged.

The swing drive shaft 33 is rigidly secured to the driving lever 21 by welding. Therefore, the swing drive shaft 33 is free from the risk of being deformed at the driving lever 21 or damaged at the coupling section of the swing drive shaft 33 and the driving lever 21 if the swing drive shaft 33 is subjected to a large torsional torque when it is driven to turn.

The driving lever 21 is made bigger than all the other levers 20. In other words, the driving lever 21 is more rigid than all the other levers 20. Therefore, it is free from the risk of being broken when rotary force is transmitted from the swing drive shaft 33 to the coupling ring 18.

The coupling ring 18 is located inside of the circular region defined by the swing shafts 32 of the nozzle vanes 31. Therefore, the exhaust turbine 11 can be made small.

The swing drive shaft 33 projects from the bearing housing 64 of the exhaust turbine 11. Therefore, the rotary drive mechanism including the sealing portion 35 and the motor can be arranged outside the bearing housing 64 and the exhaust turbine 11 can be made small. Additionally, they can be arranged in a spacious area outside the bearing housing 64 to raise the degree of design freedom.

The present invention is by no means limited to the above-described embodiment, which can be modified and/or altered in various different ways without departing from the scope of the invention.

For example, the exhaust introducing walls 16 may not necessarily be parallel walls so long as the nozzle vanes 31 are contained so as to be able to turn between them. Therefore, they may alternatively be oppositely disposed curved walls that are convex or concave relative to each other. If such is the case, however, exhaust gas can be compressed or expanded in the nozzle 13 between the exhaust gas introducing walls 16A, 16B so that their profiles need to be so selected as to allow exhaust gas to be smoothly introduced into the exhaust turbine wheel 12.

The nozzle vanes 31 are fitted to one of the exhaust introducing walls 16 that is located at the side of the shaft 51, or the exhaust introducing wall 16B, in the above embodiment. However, the nozzle vanes 31 may alternatively be fitted to the other one of the exhaust introducing walls 16A that is located at the side of the exhaust outflow section 15, so as to be able to turn. If such is the case, the swing shafts 32 of the nozzle vanes 31 and the levers 20 need to be arranged so as not to interfere with the exhaust outflow section 15. Additionally, since the exhaust outflow section 15 is normally hot, care needs to be taken so as not to damage the mechanism for driving the swing drive shaft 33 by thermal stress or the like.

The swinging motion transmitting members of this embodiment are rod-shaped levers 20. However, the present invention is by no means limited thereto. For example, the swinging motion transmitting members and the coupling ring 18 may be formed by using gears and a swinging motion may be transmitted by the gears. Alternatively, not all the swinging motion transmitting members but the one that is linked to the swing drive shaft 33 may be formed by a gear and the part of the coupling ring 18 that corresponds to the gear may be provided with teeth so as to be engaged with the gear for the purpose of transmitting a swinging motion. In other words, the swinging motion transmitting member is only required to transmit a swinging motion to the coupling ring 18 as such.

One of the swing shafts 32 is selected for the swing drive shaft 33 in the above embodiment. However, the present invention is by no means limited thereto. In other words, more than one swing shafts 32 may be selected and driven as swing drive shafts 33. Then, the load of each of the swing drive shafts 33 is reduced when they are in operation.

Figure 5:
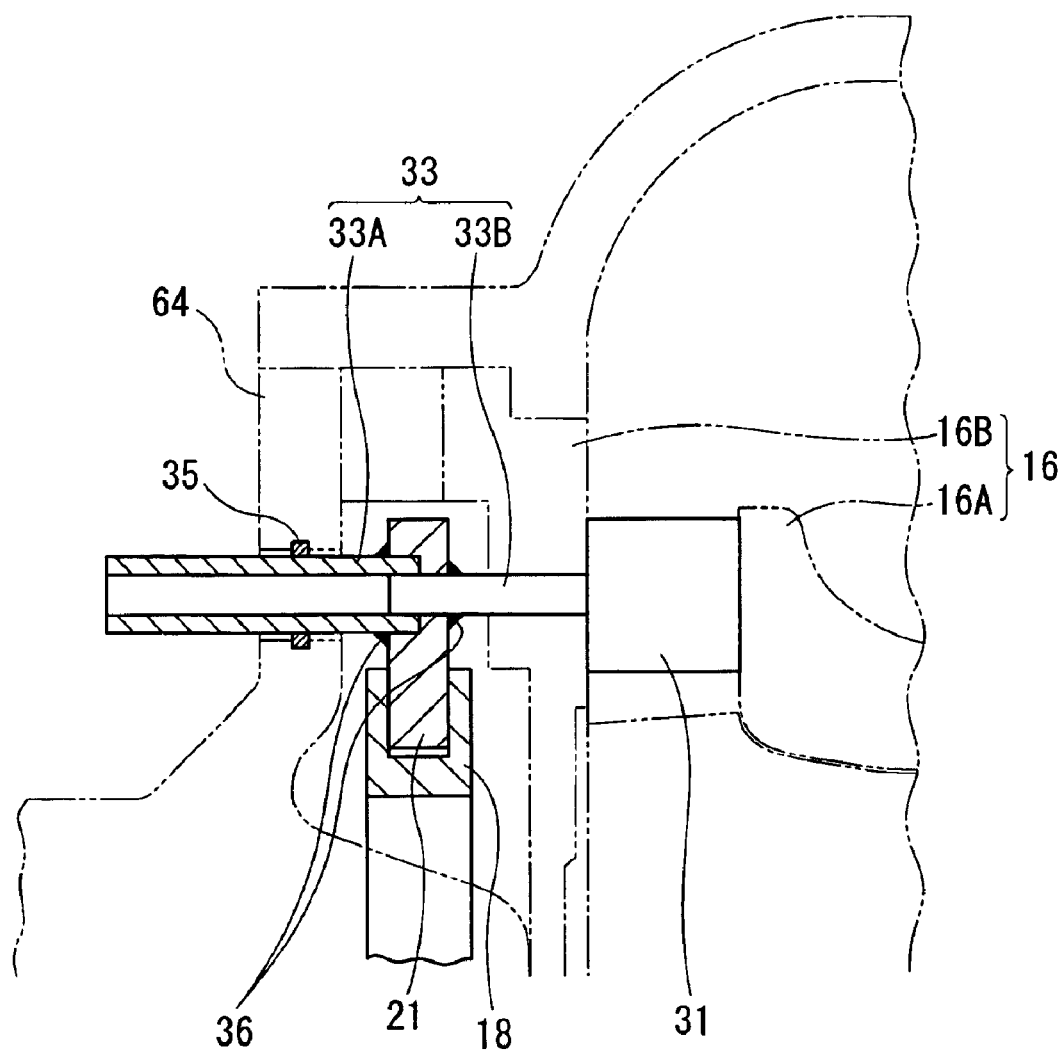
FIG. 5 is a cross sectional view showing a modification.
Figure 6:
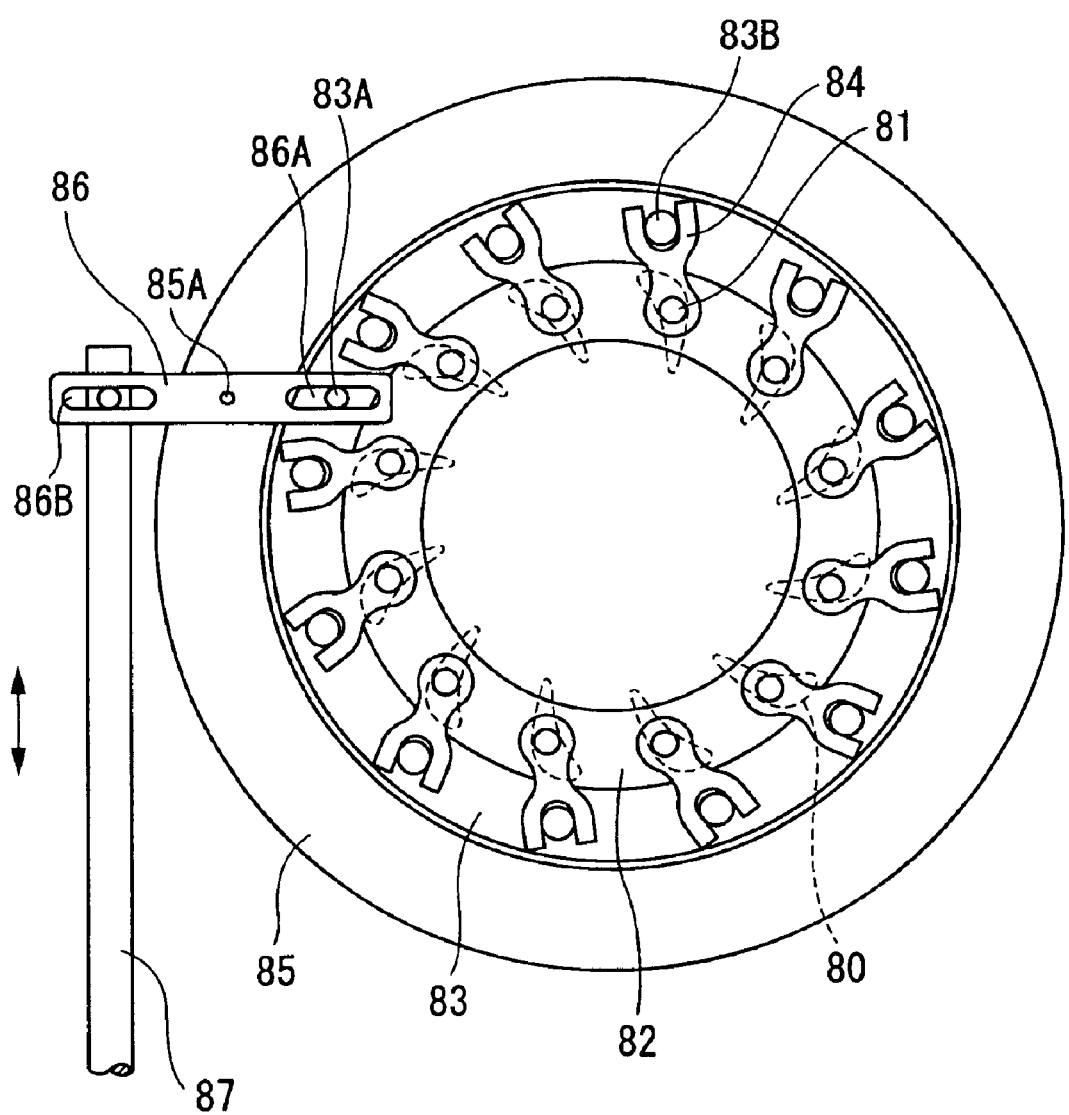
FIG. 6 is a view showing a conventional variable geometry turbocharger.

The first member 33A of the swing drive shaft 33 may be formed by a hollow shaft member as shown in FIG. 5. If such is the case, it will be free from the risk of being damaged when the swing drive shaft 33 is driven to revolve if the first member 33A is made sufficiently rigid. Alternatively, the swing drive shaft 33 may be made to be one-piece and continuous without separating it into a first member 33A and a second member 33B and the joints 36 connecting it to the driving lever 21 may be welded. Such an arrangement is also free from the risk of being damaged because the shaft that is subjected to a torsional torque when the swing drive shaft 33 is turned is made highly rigid.

Further, the swing drive shaft 33 runs through the bearing housing 64 and is coupled to the drive mechanism including a motor and the like at the outside of the bearing housing 64. However, the present invention is by no means limited thereto. The swing drive shaft 33 may not run through the bearing housing 64. For example, if a gear or the like transmits a swinging motion to the swing drive shaft 33 in the bearing housing 64, sealing operation can be easily performed so long as the member running through the bearing housing 64 can be driven to turn. The present invention includes such case.

While the swing drive shaft 33 or the member that transmits a rotary motion to the swing drive shaft 33 runs through the bearing housing 64 in the above embodiment, the present invention is by no means limited thereto. For example, it may be made to run through the turbine housing 62 so long as the externally projecting part thereof can be driven to turn. In other words, its arrangement can be appropriately selected by taking the space surrounding the variable geometry turbocharger 1 and the operating conditions thereof into consideration.

The technique for controlling the swinging angle of the nozzle vanes 31 is not limited to the use of an engine speed signal and a fuel supply rate signal. For example, an exhaust gas flow rate sensor may be fitted to the exhaust flow path and a signal representing the exhaust gas flow rate may alternatively be used as input signal. Still alternatively, the charging pressure of the charging compressor 41 may be detected and a signal representing the charging pressure may be used as input signal for controlling the swinging angle of the nozzle vanes 31.

Still alternatively, in place of a method for electrically controlling the nozzle vanes 31, the swinging angles of the nozzle vanes 31 may be mechanically regulated by manually operating the nozzle vanes 31 from the operator cabinet etc. The timing of regulating the nozzle vanes 31 may be appropriately selected.

The driving force that is applied to the swing drive shaft 33 does not necessarily come from a motor. For example, the pressure taken into the variable geometry turbocharger 1 or the pneumatic pressure or hydraulic pressure available from an external pressure source may be utilized to drive the swing drive shaft 33 to turn and change the angles of the nozzle vanes 31.

Industrial Availability

The present invention relates to a turbocharger that is applicable to the engine of an automobile, an aircraft, any of various power units or a generator.

What is claimed is:

1. A variable geometry turbocharger, comprising:
   a pair of exhaust introducing walls arranged on opposite side of a nozzle located on a periphery of an exhaust turbine wheel;
   a plurality of nozzle vanes arranged between the exhaust introducing walls along the periphery of the exhaust turbine wheel at regular intervals, each said nozzle vane being swingably supported by a respective swine shaft;
   a swinging motion transmitting member coupled to each said swing shaft at a section thereof that projects from the pair of exhaust introducing walls; and
   a coupling ring linked to the swinging motion transmitting members to interlock the swinging motion transmitting members;
   wherein at least one of the swing shafts of the plurality of nozzle vanes comprises a swing drive shaft which is externally driven to move, and wherein a first part of the swing drive shaft that extends externally from the swinging motion transmitting member coupled to the swing drive shaft is more rigid than a second part of the swing drive shaft that extends between the swinging motion transmitting member and the corresponding nozzle vane.

2. The variable geometry turbocharger according to claim 1, wherein the swing drive shaft projects through a bearing housing.

3. The variable geometry turbocharger according to claim 1, wherein the coupling ring is arranged inside a region surrounded by the swing shafts.

4. The variable geometry turbocharger according to claim 3, wherein the swing drive shaft projects through a bearing housing.

5. The variable geometry turbocharger according to claim 1, wherein the swinging motion transmitting member coupled to the swing drive shaft is more rigid than the other swinging motion transmitting members.

6. The variable geometry turbocharger according to claim 5, wherein the swing drive shaft projects through a bearing housing.

7. The variable geometry turbocharger according to claim 5, wherein the coupling ring is arranged inside a region surrounded by the swing shafts.

8. The variable geometry turbocharger according to claim 7, wherein the swing drive shaft projects through a bearing housing.

9. The variable geometry turbocharger according to claim 1, wherein the swing drive shaft is welded to the corresponding swinging motion transmitting member.

10. The variable geometry turbocharger according to claim 9, wherein the swing drive shaft projects through a bearing housing.

11. The variable geometry turbocharger according to claim 9, wherein the coupling ring is arranged inside a region surrounded by the swing shafts.

12. The variable geometry turbocharger according to claim 11, wherein the swing drive shaft projects through a bearing housing.

13. The variable geometry turbocharger according to claim 9, wherein the swinging motion transmitting member coupled to the swing drive shaft is more rigid than the other swinging motion transmitting members.

14. The variable geometry turbocharger according to claim 13, wherein the swing drive shaft projects through a bearing housing.

15. The variable geometry turbocharger according to claim 13, wherein the coupling ring is arranged inside a region surrounded by the swing shafts.

16. The variable geometry turbocharger according to claim 15, wherein the swing drive shaft projects through a bearing housing.

* * * * *